June 30, 1936. J. A. SPENCER 2,046,188

THERMOSTATICALLY CONTROLLED DEVICE

Original Filed Aug. 22, 1934 2 Sheets-Sheet 1

John A. Spencer,
Inventor,
Delos G. Haynes,
Attorney

June 30, 1936.  J. A. SPENCER  2,046,188
THERMOSTATICALLY CONTROLLED DEVICE
Original Filed Aug. 22, 1934 2 Sheets-Sheet 2

John A. Spencer,
Inventor,
Delos F. Haynes,
Attorney.

Patented June 30, 1936

2,046,188

UNITED STATES PATENT OFFICE 2,046,188

THERMOSTATICALLY CONTROLLED DEVICE

John A. Spencer, Newtonville, Mass., assignor to General Plate Company, Attleboro, Mass., a corporation of Massachusetts Original application August 22, 1934, Serial No. 740,878. Divided and this application April 29, 1935, Serial No. 18,810

6 Claims. (Cl. 236—34)

This invention relates to thermostatically controlled devices, and with regard to certain more specific features, to thermostatic valves, vanes, dampers, and the like.

This application is a division of application Serial No. 740,878, filed August 22, 1934, for "Thermostat".

Among the several objects of the invention may be noted the provision of a thermostatic valve embodying a thermostatic element which is also a valve closure element, the change of curvature of the thermostatic element in response to temperature variation being translated into valve operative movement thereof; the provision of a thermostatic valve, vane, or damper assembly which is unusually simple in construction and efficient in operation; and the provision of a new and simplified system of cooling internal combustion engines and the like. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a longitudinal section of one embodiment of the invention;

Similar reference characters indicate corresponding parts throughout the several views of the drawings.

Figure 1:
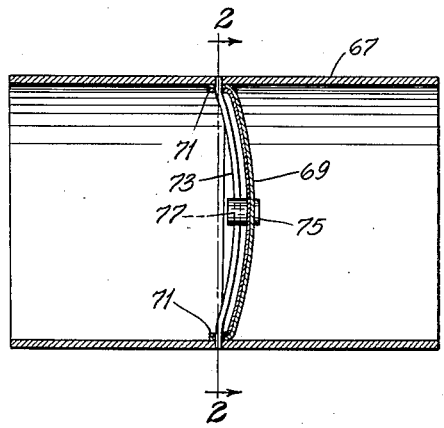
Figure 2:
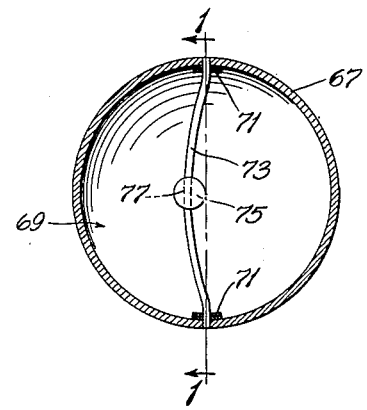
Fig. 2 is a cross section through the Fig. 1 embodiment, and taken substantially along line 2—2 of Fig. 1.
Figure 3:
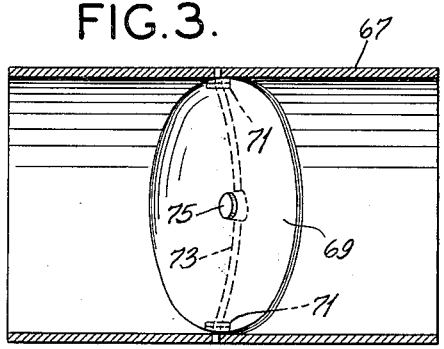
Fig. 3 is a longitudinal section similar to Fig. 1, but illustrating the valve of that embodiment in an alternative position.

Referring now more particularly to Figures 1 through 3, numeral 67 indicates a pipe or like cylindrical member. Numeral 69 indicates a dished or non-developable, composite thermostatic metal, snap-acting disc, of the type described in my Patent No. 1,448,240, dated March 13, 1923. Extending from diametrically opposed points on the periphery of the disc 69 are projections 71, drilled to receive a wire 73, the ends of which are non-rotatably secured, as by soldering, in the walls of the pipe 67. The wire 73 is curved to conform to the curvature of the disc 69, and is attached thereto at a point slightly displaced from the geometrical center thereof (see Fig. 2) by a rivet 75, through which the wire passes. The two points 71 and the point 75 comprise three points determining an oblique section of the curved surface represented by the disc 69, as is characteristic of all of the embodiments of the present invention. The importance of this arrangement will appear hereinafter. The hole 77 in the rivet 75 which accommodates the wire 73 may either be made as a yoke or close fitting depending upon the effect desired. The disc 69 is of such shape that it closes the pipe 67 when in the transverse position indicated in Figures 1 and 2 to as great an extent as is desired within practically feasible limits.

When, now, the temperature rises to such an extent that the bimetallic disc 69 reverses its curvature, it can do this only by rotating about the stationary wire 73 and assuming a position longitudinal, to a greater or less extent, to the axis of the pipe 67. This position is shown in Fig. 3.

The arrangement as thus described constitutes a thermostatic valve, vane, or damper of almost ultimate simplicity. The disc is its own closure element. When it is positioned transverse to the pipe, it means that the valve is closed; when positioned longitudinally in the pipe, the valve is wide open. Its movement between open and closed position is simple and is achieved directly in response to temperature change, without resort to intermediate motion transmitting elements, etc.

In connection with the operation of this embodiment of the invention, certain of the theoretical aspects underlying the present invention will be pointed out. The bimetallic disc 69, for example, may be considered as a mathematical surface having a curvature. For purposes of definition, it will be stated that a normal to this mathematical surface is a line intersecting the surface and perpendicular to a plane tangent to the surface at the point of intersection. Any plane that contains this normal line is called a normal plane, and the line of intersection of this normal plane with the surface is called a normal section of the surface. Any plane which intersects the surface and which contains no normal lines, is termed an oblique plane, and the line of intersection of such an oblique plane with the surface is called an oblique section of the surface. Now, it is a mathematical proposition that, if it is possible at all (depending upon the nature of the given curve), a plane may be passed through a given point on a surface so as to cut that surface in the form of a given curve having an assigned form only by taking the cutting plane, in general, in a definite position.

The invention embodies the above-stated geometry. The axial lineal element, or wire 73, is hypothetically a curve of assigned form or forms, and, by reason of its articulation to the bimetallic disc 69 (the curved surface), it corresponds to a section curve of the surface. The wire 73, if it is a plane curve, determines a plane which is an oblique plane (it cannot be normal for reasons to be advanced hereinafter). Since the wire is substantially stiff, the shape of the curve of the wire 73 tends to be maintained. However, the shape (or curvature) of the disc 69 does alter in response to temperature changes. In the abstract, mathematical sense, a second form or curvature of the disc 69 is a new surface, and, in order that the shape curve of the wire 73 shall conform to this new surface and to an oblique section thereof, or parallel to the oblique section but displaced therefrom, it is necessary that the hypothetical oblique plane containing the wire 73 shall move to a new position of obliquity, the motion involving a rotation through a definite angle determined by the extent of change of curvature of the disc 69. Expressed concretely, this rotation of the hypothetical plane to a new angle of obliquity is a rotation of the disc 69 relative to the wire 73, with a consequent change of position of the disc 69 to that shown in Fig. 3.

While the wire 73 theoretically represents a complete lineal section of the curved disc 69, there is practically no need for it to be complete, it being sufficient that it comprise three points of contact with the disc 69 (the projections 71 and the rivet 75), because three points geometrically serve to locate definitely their corresponding oblique section of the disc 69, and in addition also define the oblique, hypothetical plane which changes its angle of obliquity. Hence, from a practical standpoint, the shape of the wire 73 intermediate the three points comprising the projections 71 and the rivet 75 is of no consequence, so long as these three points lie in the desired oblique section of the disc 69, and do not block the desired movement of the disc.

These three points should lie in a plane determining an oblique, and not a normal section of the curved disc 69. The reason for this may be made clear by pointing out the objection to a normal section. A normal section, theoretically at least, would produce a "dead center" condition; the lineal element so positioned would resist relative movement between it and the curved surface, the normality producing, instead of a force tending to produce a relative movement, a force tending to press the lineal element and the curved surface more closely together. This condition would be one of instability, because a slight disturbance or malformation in either direction would initiate the motion, which might then with equal probability be in either direction, and hence not practically utilizable. However, a definite obliquity in one direction, no matter how small, causes the action to be direct, positive, and unidirectional, and hence practically utilizable.

The disc 69, in the embodiment just described, need not necessarily be made snap-acting, as is customary with non-developable discs of this general type. For valve or damper usage, it is frequently more desirable that the closure element undergo a gradual opening and shutting, this providing, in place of only a full-open and full-shut position, a series of throttling positions wherein the volume passed by the valve is proportional, to a certain extent, to the ambient temperature. A dished disc of the type disclosed may be made non-snap-acting by reducing its preformed curvature to a minimum (in other words, approaching as nearly as possible a plane disc) and/or by so heat-treating the disc that it is not strained in the manner required for snap action.

Figure 6:
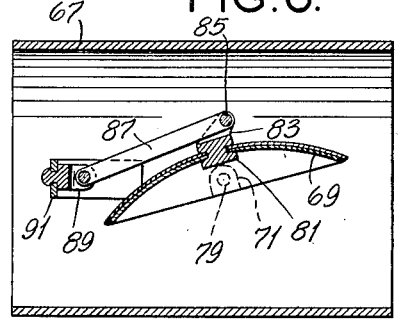
Fig. 6 is a longitudinal section similar to Fig. 5, but illustrating the valve of that embodiment in an alternative position.
Figure 4:
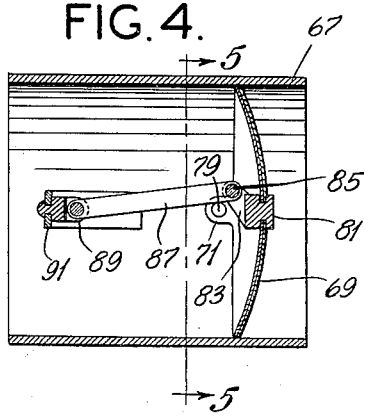
Fig. 4 is a longitudinal section of a second embodiment of the invention.
Figure 5:
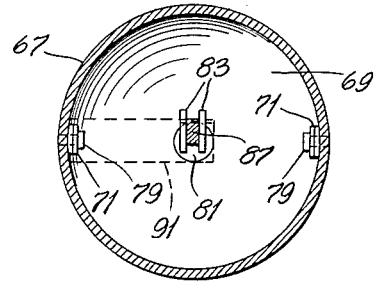
Fig. 5 is a cross section through the Fig. 4 embodiment, and taken substantially along line 5—5 of Fig. 4.

Figures 4, 5, and 6 illustrate another embodiment of this thermostat-valve. The pipe 67 and disc 69 are the same as in the Fig. 1 embodiment, as are the projections 71 from the disc 69. However, instead of the wire 73, this embodiment uses separate, short bearings 79 to rotatably secure the disc 69 to the pipe 67. At the center of the disc 69 is mounted a rivet 81, which has a pair of projections 83 extending therefrom. A pin 85 rotatably holds a connecting link 87 between the projections 83. The other end of the link 87 is similarly pinned between projections 89 supported on a standard 91 mounted on the pipe walls 67 (see the dotted lines in Fig. 5). The projections 83 extend at an angle from the axis of the rivet 81, so that the point of attachment of the link 87 to the disc 69 is effectively displaced from the hypothetical axis through the bearings 79.

When the disc 69, in this embodiment, reaches a temperature such that it must reverse its curvature, it can do this only by at the same time rotating on the bearings 79, and thus moving from a traverse to a more-or-less longitudinal position, as shown in Fig. 6. Thus, in operation, the embodiment of Fig. 4 is quite similar to that of Fig. 1.

This embodiment is illustrative of a further possible variation in the manner of carrying out the underlying principles of the invention. In the former embodiments, the points determining the oblique section of the curved surface have been illustrated as points on or parallel to the surface, in the interest of simplicity. In the present embodiment, however, the three points, which are the two bearings 79 and the pin 85, are not disposed parallel to the surface of disc 69, pin 85 being displaced therefrom an appreciable distance. However, these three points still determine a hypothetical oblique plane which intersects the curved surface, by definition, in an oblique section. The selection of the point of attachment of the rivet 81 to the disc 69 (the center, in the present embodiment) is thus seen to be subject to some variation so long as the point 85 is positioned, in cooperation with the two points 79, so as to determine an oblique plane with respect to the disc 69. The amount of the rotative motion resulting from a given change of curvature obviously depends upon the location of the three points relative to each other and the relative angle of obliquity of the plane they determine.

A further variation to be noted with respect to the present embodiment is that there is no direct connection (such as a wire) between the three points 79, 79, and 85, but these points are connected together only indirectly by the cylinder 67, bracket 91, and link 87. It will be recalled that it has heretofore been predicted that the shape of the wire (or other element) between the three points of articulation is subject to wide choice on the part of the designer. This embodiment illustrates such prediction.

It will be noted that when a wire or bent shaft is used its disposition between the three points must be such that it will not interfere with the change of curvature of the disc 69.

Figure 7:
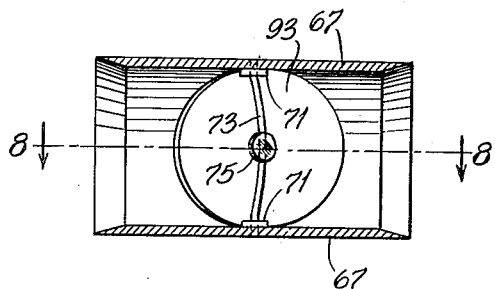
Fig. 7 is a longitudinal section of a third embodiment of the invention, similar to the embodiment of Fig. 1.
Figure 8:
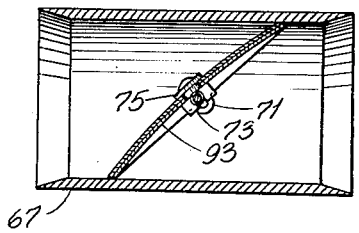
Fig. 8 is a longitudinal section taken on line 8—8 of Fig. 7.
Figure 9:
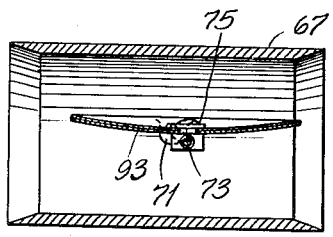
Fig. 9 is a longitudinal section similar to Fig. 8, but illustrating the valve in an alternative position.

Figures 7, 8 and 9 illustrate a practical variation of the embodiment of Figures 1, 2, and 3. It has been found in practice that it is difficult to obtain a complete shut-off of the cylinder 67 with a circular valve-disc 69 as shown in Fig. 1. This is because the circular shape, in order to be movable at all within the cylinder 67, must be slightly less in diameter than the inner diameter of the cylinder, and, being so, it cannot effectively seat to assure a complete shut-off unless special seats are provided on the inside walls of the cylinder. In the embodiment of Figures 7, 8, and 9 this problem is taken care of by providing an elliptical disc 93 in place of the circular disc 69. When in closed position (Fig. 8) the elliptical form seats on the cylinder walls throughout the preponderant part of its periphery. The open position of the elliptical disc (Fig. 9) is displaced from the closed position by a lesser angle than the respective positions of the circular disc which is a further advantage as the demands on the thermostatic element are accordingly reduced. This may well be provided for by altering the angle of obliquity of the oblique section of the disc by suitably positioning the points 71, 71, and 75. The attachment of the disc 93 to the cylinder 67 is the same as that shown in Fig. 1, and the action is essentially the same.

Figure 10:
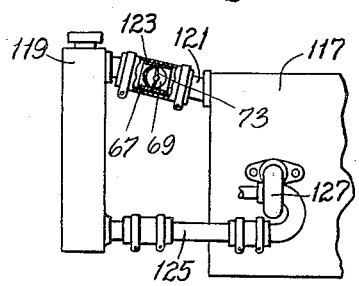
Fig. 10 is a diagrammatic view of the cooling system of an internal combustion engine, embodying the present invention.

Fig. 10 shows, in diagrammatic form, one of the practical applications of the embodiments of the invention shown in Figures 1 through 9. This is an internal combustion engine cooling system; more specifically, an automobile engine cooling system. Numeral 117 indicates the engine jacket. Numeral 119 indicates the cooling radiator. A connection 121 joins the upper part of the engine jacket 117 to the upper part of the radiator 119, a valve 123 (of the type of any of the embodiments shown in Figures 1 through 9) being interposed in the connection 121. A lower connection 125 joins the lower end of the radiator 119 to a water pump 127, which in turn returns the water, under pressure, to the engine jacket 117.

The valve 123 is so arranged that when the water in the system is below a certain temperature, said valve is closed, while if the water is above that temperature, the valve is open. Upon starting the engine, therefore, with cold water in the cooling system, the valve 123 remains closed until the water reaches a predetermined temperature, thereafter opening. This makes for maximum operating efficiency of the engine and maintains a sufficiently high temperature even in cold weather so that hot water from the engine jacket may be used in a heater as for example for the passenger quarters of the car.

It is of course obvious that the cooling system shown is diagrammatic, and merely exemplary of the several systems of this type now in use in the automotive field. The valve of the present invention works equally well with these other systems.

In all of the embodiments of the invention, as shown in the drawings, the extent of curvature of the various thermostatic elements has been exaggerated relative to their size, in order more clearly to show the effects of the change of curvature. In practical embodiments of the invention, these curvatures are relatively slight. This is of particular importance because, with the curvatures actually shown, a few reversals of curvature might be attended by a breaking-off of the projection 71. In practice, the bending moments on the projections 71 incident to reversal of curvature are quite slight, so that the breaking-off does not take place.

It is also to be noted that the thicknesses of the plates throughout the drawings have been greatly exaggerated with respect to the sizes of the plates, in order to show more clearly their bimetallic construction where such (specifically) is used.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A thermostatic valve comprising a cylinder, a dished, composite thermostatic metal disc, mounting means for said disc comprising a wire articulated to the disc at substantially opposite points on the periphery thereof, and at a point near the center but displaced from the plane normal to said disc passing through said points on the periphery, said wire being non-rotatably secured to said cylinder at the ends thereof, whereby said disc in one position substantially closes said cylinder, and upon reversal of curvature of said disc, said disc is forced to rotate about said wire to a position in which said cylinder is open for passage therethrough.

2. A thermostatic valve comprising a cylinder, a dished composite thermostatic metal disc, means for mounting said disc in said cylinder comprising separate pins mounted in the cylinder walls and articulated to the disc at substantially opposite points on the periphery thereof, a rigid standard mounted in the cylinder, and a link articulated to the rigid standard and to a central point on the disc effectively displaced from the plane normal to said disc passing through said points on the periphery, whereby said disc, in one position, substantially closes said cylinder, and upon reversal of curvature of said disc, said disc is forced to rotate to a position in which said cylinder is open for passage therethrough.

3. A thermostatic valve comprising a cylinder, valve closure means in said cylinder comprising a thermostatic plate the curvature of which changes in response to temperature variations, means mounting said thermostatic plate in said cylinder, said means being articulated to said thermostatic plate, said means containing three spaced points determining a non-normal plane to the thermostatic plate, said three points always maintaining a non-linear relationship.

4. A thermostatic valve comprising a cylinder, a valve closure element in said cylinder comprising a thermostatic plate the curvature of which changes in response to temperature variations, means mounting said plate in said cylinder, said means being articulated to said plate, said means containing at least three spaced points, said points determining a hypothetical plane which is oblique to the thermostatic plate at certain temperatures, said three points never reaching a straight line position with respect to each other during changes of curvature of said thermostatic plate, whereby, upon change of curvature of said thermostatic plate, the angle of obliquity of said hypothetical plane changes.

5. A thermostatic valve as set forth in claim 3, in which the thermostatic plate comprises a non-developable disc.

6. A thermostatic valve as set forth in claim 4, in which the thermostatic plate comprises a non-developable thermostatic disc.

JOHN A. SPENCER.